No. 777,904. PATENTED DEC. 20, 1904.
W. KOERPER.
WAGON BRAKE.
APPLICATION FILED AUG. 17, 1904.
NO MODEL.

Witnesses
F. F. Ayers.
Wm. O. Morck.

Inventor
William Koerper
By Thompson R. Bell
Attorney

No. 777,904.    Patented December 20, 1904.

UNITED STATES PATENT OFFICE.

WILLIAM KOERPER, OF IRONTON, OHIO.

WAGON-BRAKE.

SPECIFICATION forming part of Letters Patent No. 777,904, dated December 20, 1904.

Application filed August 17, 1904. Serial No. 221,053.

*To all whom it may concern:*

Be it known that I, WILLIAM KOERPER, a citizen of the United States, residing at Ironton, in the county of Lawrence and State of Ohio, have invented a certain new and useful Improvement in Wagon-Brakes, of which the following is a specification, reference being had therein to the accompanying drawings.

My invention relates to improvements in brakes for wagons, particularly closed wagons, as will be hereinafter more fully described, and particularly pointed out in the claims.

The object of this invention is to provide a brake mechanism to be applied to wagons or other vehicles, and is particularly designed for use in connection with closed wagons, which mechanism will be readily operated by the driver within the wagon without necessitating the opening of a door or of the wagon-doors in cold or wet weather, or in any way inconveniencing said driver or occupant of the wagon; also, to provide a brake that will be simple in construction and easy and effective in operation. I attain these objects by means of the brake mechanism illustrated in the accompanying drawings, in which similar numerals of reference designate like parts throughout the several views.

Figure 1:
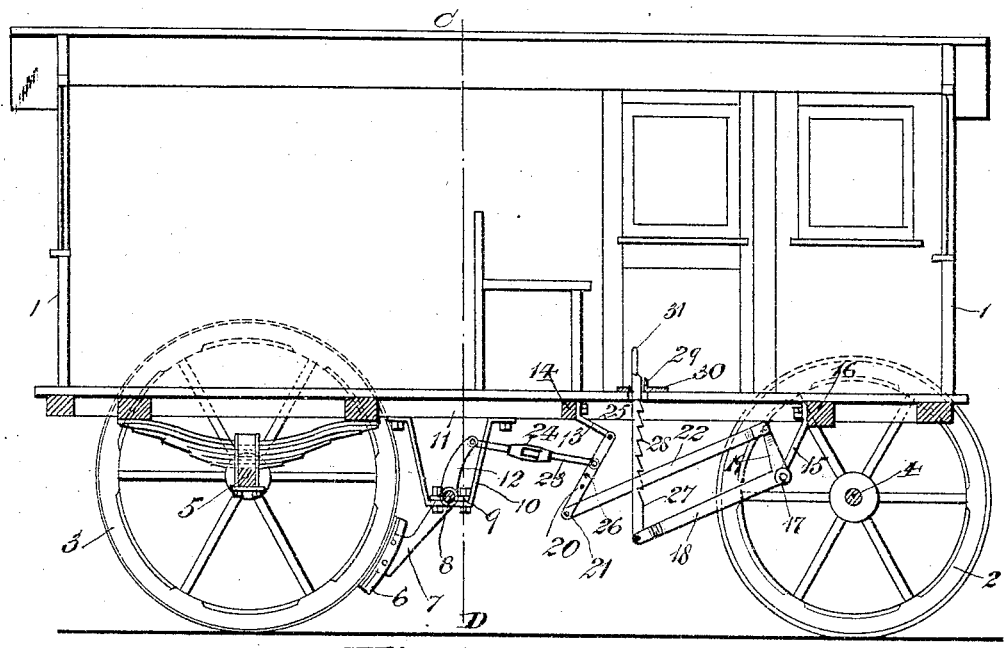
Figure 2:
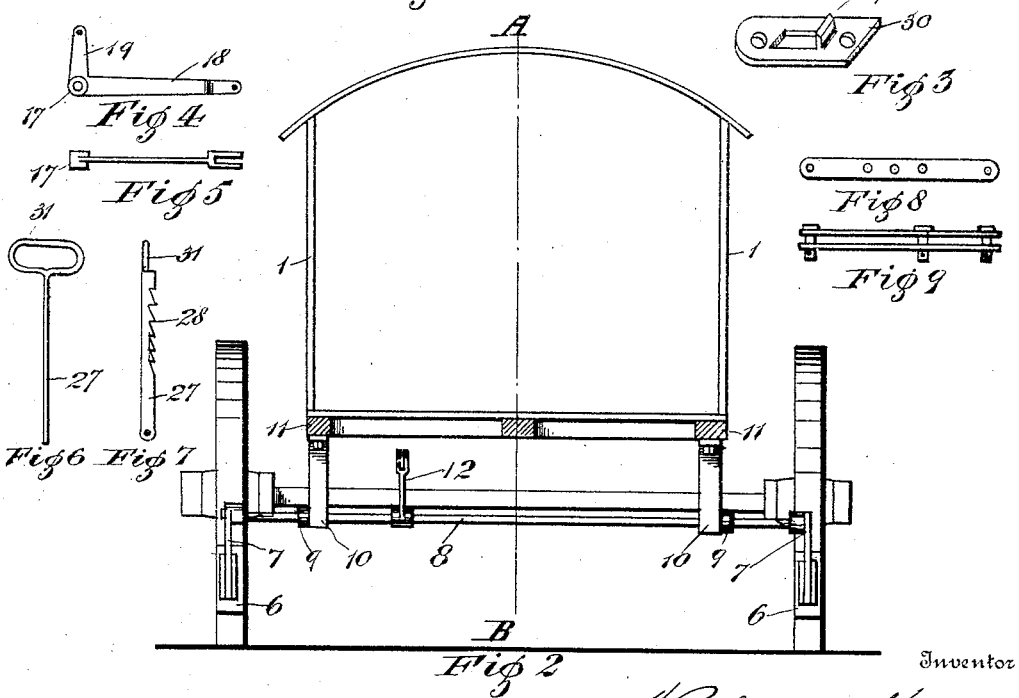

Figure 1 is a longitudinal sectional elevational view of a closed wagon, showing my invention of a brake mechanism applied thereto and taken through the line AB. (See Fig. 2.) Fig. 2 is a transverse sectional view of the same, taken through the line CD. (See Fig. 1.) Fig. 3 is a perspective detail view of the retaining-catch for the notched brake-rod. Fig. 4 is a detail view of the main crank-lever of the brake mechanism. Fig. 5 is an edge or plan view of the same. Fig. 6 is a detail edge view of the notch lever-rod. Fig. 7 is a similar side view of the same. Fig. 8 is an enlarged side detail view of the suspension brake-lever, and Fig. 9 is an enlarged edge view of the same.

A closed or box wagon 1 is carried by suitable wheels 2 and 3, mounted on their supporting-axes 4 and 5. The brake-shoes 6 may be of any suitable form of construction and carried by brake-hangers 7, keyed or otherwise secured at their top ends on the transversely-extending ends of the revoluble brake-shaft 8. The brake-shaft 8 is journaled in suitable bearings 9 at or near each of its ends, which bearings are carried by the drop-hangers 10, which drop-hangers are securely bolted to the side beams or bars 11 under the floor of the body of the wagon. The upwardly-extending brake-lever arm 12 is secured on the transversely-extending brake-shaft 8 in position thereon intermediate the drop-hangers 10. Directly in front of the upwardly-extending lever-arm 12 and in alinement therewith is the fulcrum-arm 13, which is bolted to the transversely-extending floor-beam of the wagon 14, situated beneath the floor thereof. In advance of the said fulcrum-arm 13 is a similar downwardly extending or depending fulcrum-arm 15, which is securely bolted at its top end to the transversely-extending floor-beam 16, and to its bottom end the fulcrum of the bell-crank lever 17, provided with a longer arm 18 and a shorter arm 19, is pivoted.

Suspended from the end of the fulcrum-arm 13 is the suspension or depending lever 20, the bottom end 21 of which is connected to the free end of the bell-crank shorter arm 19 by the connecting-rod 22. The suspension-lever 20 is comprised of two separate levers, between the ends of which the connecting-rod 22 and the fulcrum-arm 13 freely work and to which said rods are pivoted. An adjustable or extensible connecting-rod 23, provided with the turnbuckle 24, connects the end of the upwardly-extending lever-arm 12 to the suspension-lever 20 at a point intermediate its fulcrum end 25 and its lower depending end 21. A series of pin-holes 26 are formed in the suspension-lever 20 for the purpose of varying the amount of throw of the lever 20 to vary the swing of the upwardly-extending lever 12 to compensate for wear and tear of the brake-shoes and mechanism. A notch-rod 27, having the notches 28, adapted to engage the catch 29, formed on the notch-plate 30, is pivotally connected at its bottom end to the free end of the longer arm 18 of the bell-crank lever. A hand-grip 31 is formed on the upper end of the notch-rod 27, whereby the operator can readily grasp the same to operate the brake mechanism. The plate 30 is secured to the floor of the wagon in any suitable manner, as by screws or bolts.

When it is required to operate this brake to cause the brake-shoes 6 to contact with the rear wagon-wheels, all that is necessary for the operator to do is to grasp the hand-grip 31 of the rod 27 and draw the same upwardly the required extent and cause any one of the notches 28 to engage the catch 29 to retain the notch-rod 27 in any fixed position to maintain the brake-shoes 6 in contact with said rear wheels 3 to prevent the rotation of the latter. By raising the rod 27 the longer arm 18 of the bell-crank lever 17 is elevated and the shorter arm 19 is swung forward on its pivotal point to swing the suspension-lever 20 forwardly, thereby operating the upwardly-extending lever 12 to turn the shaft 8 and bring the shoes 6 in contact with the rear wheels of the wagon.

It is obvious that a great deal of power can be applied to the brake-shoes by means of the above-described mechanism, and the same is simple, durable, and effective as a brake mechanism.

Having thus fully described this my invention, what I claim as new and useful, and desire to cover by Letters Patent of the United States therefor, is—

1. In a wagon-brake, the combination with a wagon mounted on suitable wheels, a transversely-extending shaft, drop-hangers extending from the floor of said wagon, brake-shaft bearings carried by said drop-hangers, brake-hangers on the end of said shaft, and brake-shoes carried by said hangers, of a lever on said shaft, a suspension-lever in advance of said lever, an extensible connecting-rod connecting said lever to said suspension-lever, a forward bell-crank lever, a rod connecting the lower depending end of said suspension-lever to one of the arms of said bell-crank lever, a notched rod connected at its lower end to the other arm of said bell-crank lever and means for engaging the notch-rod in position to retain the brake-shoes in contact with their wheels.

2. In a wagon-brake, the combination with a wagon mounted on suitable wheels, a transversely-extending shaft, drop-hangers extending from the floor of said wagon, brake-shaft bearings carried by said hangers, brake-hangers on the end of said shaft, brake-shoes carried by said hangers, of a lever on said shaft, a suspension-lever in advance of said shaft-lever provided with a series of connecting pin-holes, a connecting-rod comprising extensible end portions and a connecting-turnbuckle whereby the length of said rod may be increased or diminished, a forward bell-crank lever, a rod connecting the lower depending end of said suspension-lever to one of the arms of said bell-crank lever, a notched rod connected to the other arm of said bell-crank lever and means for engaging the notch-rod in position to retain the brake-shoes in contact with their wheels.

3. In a wagon-brake, the combination with a closed or box wagon mounted on suitable wheels, a notched rod situated to extend within said boxed wagon, a transversely-extending shaft, drop-hangers extending from the floor of said wagon, brake-shaft bearings carried by said hangers, brake-hangers on the end of said shaft, brake-shoes carried by said hangers, of a lever on said shaft, a suspension-lever in advance of said shaft-lever provided with a series of connecting pin-holes, a connecting-rod comprising extensible end portions and a connecting-turnbuckle whereby the length of said rod may be increased or diminished, a forward bell-crank lever, a rod connecting the lower depending end of said suspension-lever to one of the arms of said bell-crank lever the other arm of said bell-crank lever connected to said notched rod, and means for engaging the notch-rod in position to retain the brake-shoes in contact with their wheels.

In testimony whereof I affix my signature in presence of two witnesses.

WILLIAM KOERPER.

Witnesses:
ELIZABETH SCHRADER,
EDWARD E. CORN.